United States Patent
Ojha et al.

(10) Patent No.: US 11,082,451 B2
(45) Date of Patent: Aug. 3, 2021

(54) MAINTAINING CONTINUOUS NETWORK SERVICE

(71) Applicant: Citrix Systems, Inc., Fort Lauderdale, FL (US)

(72) Inventors: Nivedita Ojha, Campbell, CA (US); Derek Thorslund, San Jose, CA (US); Stephen Wilson, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 28 days.

(21) Appl. No.: 16/547,102

(22) Filed: Aug. 21, 2019

(65) Prior Publication Data

US 2020/0213183 A1     Jul. 2, 2020

Related U.S. Application Data

(60) Provisional application No. 62/786,813, filed on Dec. 31, 2018.

(51) Int. Cl.
*H04L 12/703* (2013.01)
*H04L 29/06* (2006.01)
(Continued)

(52) U.S. Cl.
CPC .......... *H04L 63/20* (2013.01); *H04L 41/0668* (2013.01); *H04L 41/0681* (2013.01); *H04L 41/5019* (2013.01); *H04L 45/22* (2013.01); *H04L 45/24* (2013.01); *H04L 45/28* (2013.01); *H04L 63/0272* (2013.01); *H04L 63/08* (2013.01); *H04L 63/0853* (2013.01); *H04L 63/10* (2013.01); *H04W 4/02* (2013.01);
*H04W 24/04* (2013.01); *H04W 36/305* (2018.08); *H04W 64/003* (2013.01); *G06F 8/65* (2013.01);
(Continued)

(58) Field of Classification Search
None
See application file for complete search history.

(56) References Cited

U.S. PATENT DOCUMENTS

| | | |
|---|---|---|
| 10,044,674 B2 | 8/2018 | Liu et al. |
| 2005/0163093 A1 | 7/2005 | Garg et al. |

(Continued)

FOREIGN PATENT DOCUMENTS

| | | |
|---|---|---|
| EP | 3343962 | 7/2018 |
| KR | 101688812 | 12/2016 |
| WO | 20140116528 | 7/2014 |

OTHER PUBLICATIONS

SD-Wan; downloaded from: https://en.wikipedia.org/w/index.php?title=SD-WAN&oldid=874371114; dated Dec. 18, 2018.
(Continued)

*Primary Examiner* — Kouroush Mohebbi
(74) *Attorney, Agent, or Firm* — BainwoodHuang

(57) ABSTRACT

A technique for managing communications over a network maintains multiple network paths simultaneously, exchanging the same data redundantly through the network paths and allowing a receiver to select one of the network paths as its source of data. In the event that a first, currently-selected network path becomes weak, for example, the receiver automatically and seamlessly switches its source of data to a second network path, while the first network path remains operational.

30 Claims, 10 Drawing Sheets

(51) Int. Cl.
| | |
|---|---|
| *H04W 4/02* | (2018.01) |
| *H04W 64/00* | (2009.01) |
| *H04W 36/30* | (2009.01) |
| *H04L 12/24* | (2006.01) |
| *H04L 12/707* | (2013.01) |
| *H04W 24/04* | (2009.01) |
| *G06F 8/65* | (2018.01) |
| *G06F 21/56* | (2013.01) |

(52) U.S. Cl.
CPC ...... *G06F 21/566* (2013.01); *G06F 2221/034* (2013.01)

(56) References Cited

U.S. PATENT DOCUMENTS

| | | |
|---|---|---|
| 2010/0124196 A1 | 5/2010 | Bonar et al. |
| 2013/0103785 A1 | 4/2013 | Lyon |
| 2014/0032759 A1* | 1/2014 | Barton ................ H04W 12/06 709/225 |
| 2015/0121482 A1 | 4/2015 | Berman et al. |
| 2016/0182655 A1 | 6/2016 | Entezari et al. |
| 2016/0330667 A1* | 11/2016 | Surmay ................ H04L 65/604 |
| 2017/0195121 A1 | 7/2017 | Frei et al. |
| 2017/0310445 A1 | 10/2017 | Kalligudd |
| 2018/0248892 A1 | 8/2018 | Hefetz |

OTHER PUBLICATIONS

LinkAggregation.odf; downloaded from https://en.wikipedia.org/w/index.php?title=Link_aggregation&oldid=873334099; dated Dec. 12, 2018.

ImpactOfMultipathRouting.pdf; D. Belabed et al.; downloaded from https://pdfs.semanticscholar.org/b984/b081877d8757848a3abdef1910200875811a.pdf; dated Jun. 30, 2014.

4g-usb-modem.pdf; downloaded from https://www.4gltemall.com/4g-usb-modem.html; dated on or before Nov. 30, 2018.

Broadband.pdf; downloaded from https://whatismyipaddress.com/broadband; dated on or before Dec. 13, 2018.

* cited by examiner

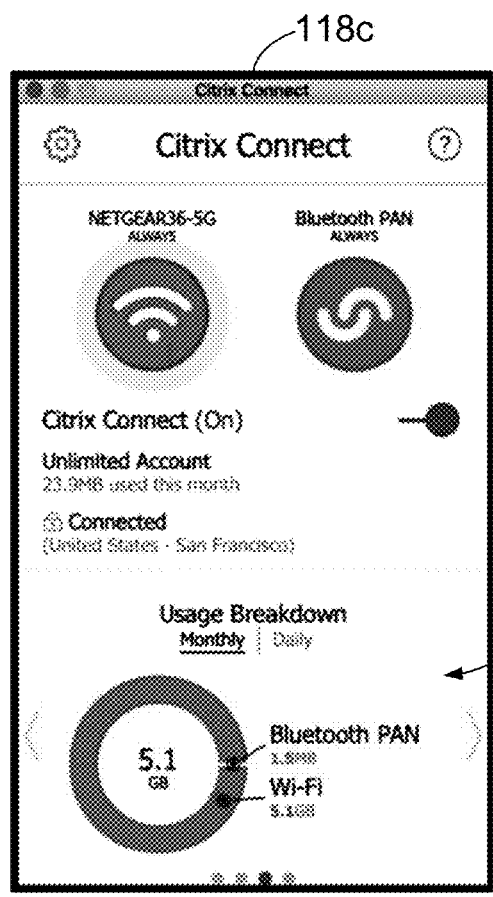
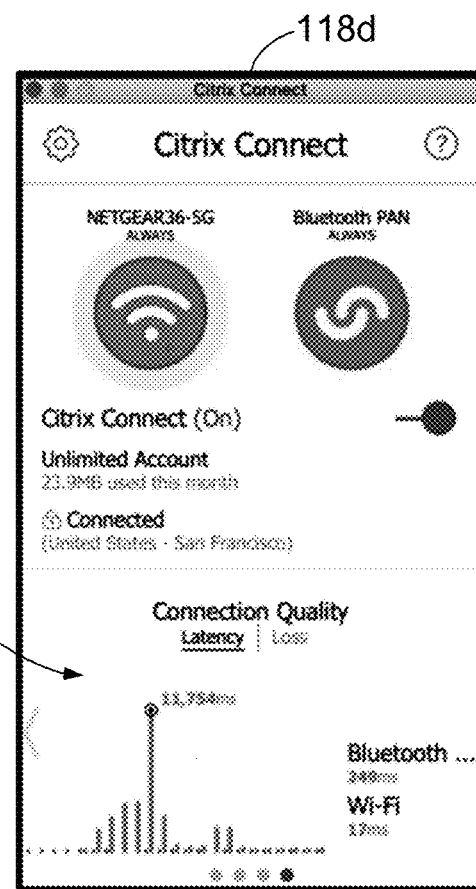
*FIG. 4c*          *FIG. 4d*

MAINTAINING CONTINUOUS NETWORK SERVICE

CROSS-REFERENCE TO RELATED APPLICATION(S)

This application claims the benefit of U.S. Provisional Application No. 62/786,813, filed Dec. 31, 2018, the contents and teachings of which are incorporated by reference herein in their entirety.

BACKGROUND

It is common for modern computing devices to support multiple network connections. For example, a laptop computer might support Ethernet, Wi-Fi (IEEE 802.11x), and cellular network connections. If one network connection fails, a user has the option to change networks, e.g., by accessing network settings on the laptop and selecting a different network.

Some devices change network connections automatically. For example, a user of a smart phone might start listening to a podcast at home, where the phone is connected to Wi-Fi, but then might decide to continue listening outside. When the user gets out of Wi-Fi range, the smart phone detects the loss of Wi-Fi and switches over to cellular service. With adequate buffering the transition may appear seamless, with the user never noticing that there has been a connection failure and then a failover from Wi-Fi to cellular service.

SUMMARY

Unfortunately, certain applications do not support seamless transitions when the devices on which they run switch networks. For example, applications like web conferencing, which involve real-time interactivity, may temporarily freeze when network connections change. In some cases, establishing a new connection may require handshaking or other communications, which can extend the durations of outages. Even if outages are only momentary, they can still cause frustration and annoyance and thereby diminish the user experience.

In contrast with conventional approaches, in which network failover can cause a temporary loss of function, an improved technique maintains multiple, network paths simultaneously, exchanging the same data redundantly through the network paths and allowing a receiver to select one of the network paths as its source of data. In the event that a first, currently-selected network path becomes weak, for example, the receiver can automatically and seamlessly switch its source of data to a second network path, while the first network path remains operational. Given that the second network path is already on and conveying data, the transition is nearly instantaneous. Even highly interactive applications running in environments having network dead zones or interference can remain fully functional with generally no downtime or other loss of function. Reliability and user experience are thereby enhanced.

Certain embodiments are directed to a client method that includes monitoring, by a client device, a plurality of network paths that convey data between the client device and a server, the data being associated with a single application on the server. The method further includes receiving, by the client device, the data from the server via each of the plurality of network paths, the data received from each of the plurality of network paths being the same. The method still further includes selecting, by the client device, a first network path of the plurality of network paths from which to receive data to enable delivery of the single application on the server to the client device, and adjusting, by the client device, the selected network path from the first network path to a second network path of the plurality of network paths based at least in part on the monitoring of the plurality of network paths, so as to prevent delay in receipt of data from the server caused by a reduction of network continuity of the first network path.

Further embodiments are directed to a client device configured to perform a method, such as the client method described above. Still other embodiments are directed to a computer program product. The computer program product stores instructions which, when executed by control circuitry of a client device, cause the client device to perform a method such as the client method described above.

Other embodiments are directed to a server method that includes receiving, by a server, application data from a client device for a single application. The application data is received via a plurality of network paths in parallel, and the plurality of network paths all convey the same application data. The method further includes assigning a first network path of the plurality of network paths as a source of the application data for a server component running on the server, and adjusting the source of the application data for the server component from the first network path to a second network path of the plurality of network paths based at least in part on an indicator received from the client device, so as to prevent delay in reception of data caused by a reduction of network continuity of the first network path.

Further embodiments are directed to a server configured to perform a method, such as the server method described above. Still other embodiments are directed to a computer program product. The computer program product stores instructions which, when executed by control circuitry of a server, cause the server to perform a method such as the server method described above.

Still further embodiments are directed to a system method that includes establishing an encrypted channel between a client device and a server, the encrypted channel configured to convey encrypted communications for a single application, and monitoring a plurality of network paths used by the encrypted channel between the client device and the server. The method further includes transmitting, by the server, a set of application data of the single application to the client device over the encrypted channel via each of the plurality of network paths, each of the plurality of network paths conveying the same set of application data, and selecting, by the client device, a first network path of the plurality of network paths as a source of application data for a client component running on the client device. The method still further includes adjusting, by the client device, the source of data from the first network path to a second network path of the plurality of network paths based at least in part on the monitoring of the plurality of network paths, so as to prevent delay in communicating data between the client device and the server caused by a reduction of network continuity of the first path.

Some embodiments are directed to a system configured to perform a method, such as the system method described above. Still other embodiments are directed to a computer program product. The computer program product stores instructions which, when executed by control circuitry of a system, cause the system to perform a method such as the system method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

FIGS. 4a-4d are simulated screenshots of a graphical user interface (GUI) of a client application component.

DETAILED DESCRIPTION

Embodiments of the improved technique will now be described. One should appreciate that such embodiments are provided by way of example to illustrate certain features and principles but are not intended to be limiting.

An improved technique for operating an application maintains multiple, simultaneous network paths, exchanging the same data redundantly through the network paths and enabling a receiver to select one of the network paths as a source of the data.

Figure 1:
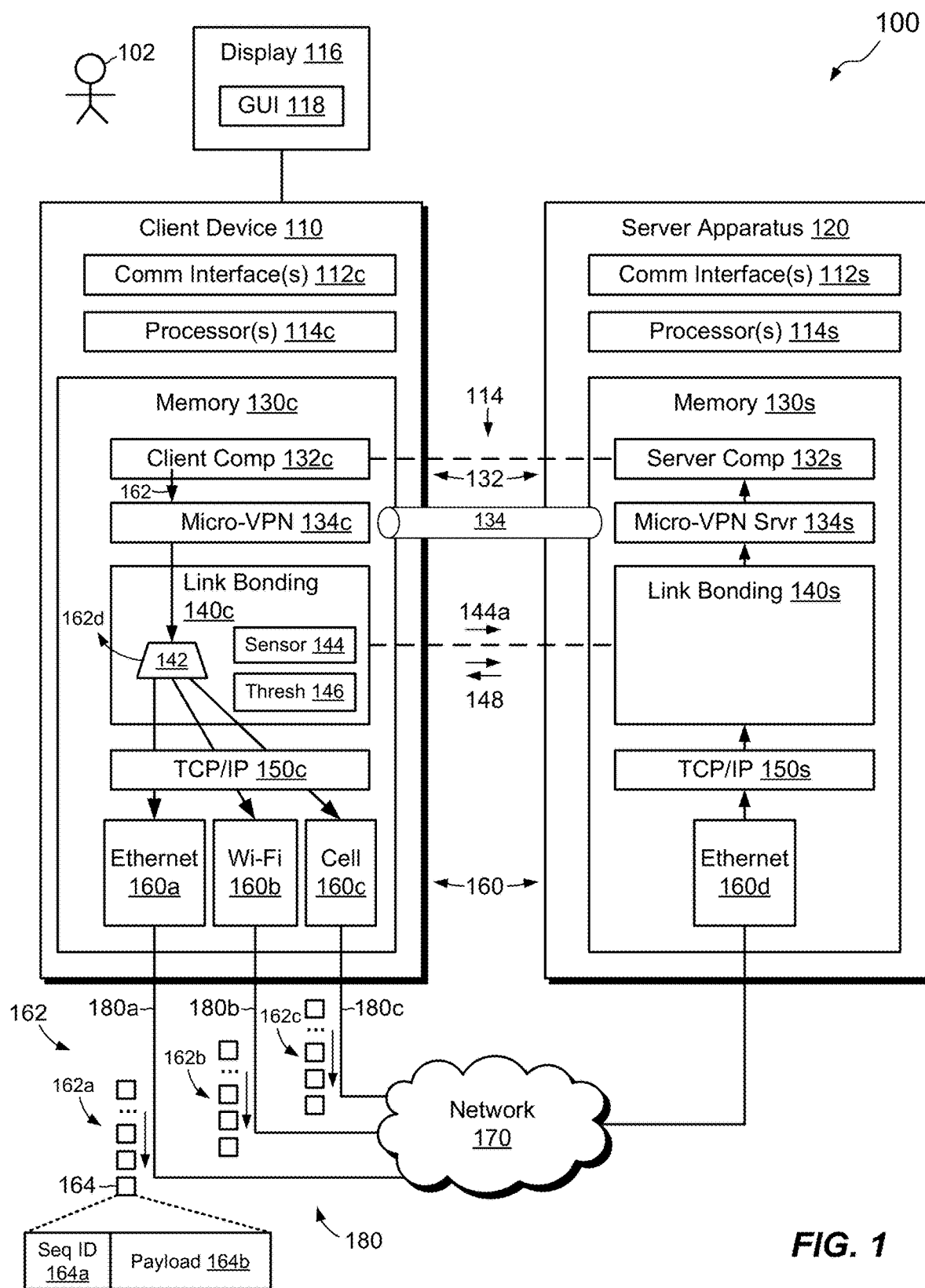
FIG. 1 is a block diagram of an example environment in which embodiments of the improved technique can be practiced.

FIG. 1 shows an example environment 100 in which embodiments of the improved technique can be practiced. Here, a client device 110 ("client") is operatively connected to a server apparatus 120 ("server") over a network 170, such as a local area network (LAN), a wide area network (WAN), the Internet, and/or some other type of network or combination of networks. The client 110 may be provided as any user-operable computer or device, such as a laptop computer, desktop computer, tablet computer, smart phone, personal data assistant, set-top box, gaming system, or the like. The server 120 may be provided in a similar form, but is typically a server-grade computer that runs in a data center and is available "in the cloud," meaning on the Internet. In some examples, the server 120 is implemented using multiple computers, as part of a distributed server or server cluster.

The client 110 is connected to the network 170 via multiple paths 180, which may include an Ethernet path 180a, a Wi-Fi path 180b, and a cellular data path 180c, for example. A greater or fewer number of paths 180 may be provided, and the disclosure is not limited to any particular type or types of paths. In an example, the cellular data path 180c is an LTE (Long-Term Evolution) data path. The client 110 has a display 116, such as a monitor, touch screen, or the like, and the display 116 is configured to render a graphical user interface (GUI) 118, which may be operated by a user 102.

As shown, the client 110 includes one or more communication interfaces 112c, such as an Ethernet port, a Wi-Fi antenna, a cellular antenna, and/or the like. The client 110 also includes a set of processors 114c, such as one or more processing chips and/or assemblies, and memory 130c, which may include both volatile memory, e.g., RAM (Random Access Memory), and non-volatile memory, such as one or more ROMs (Read-Only Memories), disk drives, solid state drives, and the like. The set of processors 114c and the memory 130c together form client control circuitry, which is constructed and arranged to carry out various client methods and functions as described herein. Also, the memory 130c includes a variety of software constructs realized in the form of executable instructions. When the executable instructions are run by the set of processors 114c, the processor(s) carry out the operations of the software constructs. Although certain software constructs are specifically shown and described, it is understood that the memory 130c typically includes many other software components, which are not shown, such as an operating system, various applications, processes, and daemons.

The configuration of the server 120 may be similar to that of the client 110, with communication interface(s) 112s, processor(s) 114s, and memory 130s. The processor(s) 114s and memory 130s form server control circuitry, which is constructed and arranged to carry out various server methods and functions as described herein. When the executable instructions on the server 120 are run by the processor(s) 114s, the processor(s) carry out the operations of the software constructs.

As further shown in FIG. 1, the memory 130c of client 110 "includes," i.e., realizes by execution of software instructions, a client component 132c of a software application 132, a micro-VPN (Virtual Private Network) client 134c, and a link bonding client 140c. The memory 130c further includes a TCP/IP (transmission control protocol/Internet protocol) driver 150c, as well as additional drivers 160, such as Ethernet driver 160a, Wi-Fi driver 160b, and cellular data driver 160c.

Turning now to the server 120, the memory 130s includes a server component 132s of the software application 132, a micro-VPN server 134s, and a link bonding service 140s. The memory 130s further includes a TCP/IP driver 150s, as well as one or more drivers 160 for one or more connection paths 180. In a particular example, the server 120 uses only a single connection path, such as Ethernet, which is accessed via an Ethernet driver 160d.

In an example, the micro-VPN client 134c and the link bonding client 140c are provided as respective software libraries, with each library having its own API (Application Program Interface) for exposing its respective functions. In addition, the micro-VPN client 134c and the link bonding client 140c may each be "scoped" to the client component 132c of the application program 132, meaning that their functionality is limited to communications involving the application program 132 and does not generally extend to other programs running on the client device 110. For example, the micro-VPN client 134*c* coordinates with the micro-VPN server 134*s* to establish an encrypted channel, such as a network tunnel 134, which is limited to communications over the network 170 between the client component 132*c* and the server component 132*s*. Rather than the tunnel 134 applying to the entire client device 110 (which is a common arrangement for conventional VPNs), the tunnel 134 can instead be restricted to network traffic of the application program 132 that passes between the client 110 and the server 120. In this arrangement, other network activity conducted by other programs running on the client device 110 may fall outside of the tunnel 134, where such activity is not secured by the tunnel 134. The micro-VPN thus provides the network tunnel 134 for a particular application, rather than for the client machine 110 as a whole. Among other things, this feature enables the micro-VPN, along with the link bonding client 140*c* and client application code 132*c*, to be provided in a single downloadable package (see FIG. 2), which can be installed on the client device 110, avoiding the need for multiple installation procedures and keeping all the related parts together. In an example, the micro-VPN client 134*c* and server 134*s* are configured to establish the encrypted channel by performing encryption and decryption of data passed through the tunnel 134. They may also be configured to restrict connections to designated resources on the network 170, e.g., by applying a white list of allowed sites and/or a black list of blocked sites. One should appreciate that the term "channel" as used herein is not limited to any one network path but rather encompasses all communication over all of the network paths 180. The link bonding client 140*c* is configured to direct outgoing data (from the client component 132*c*) over multiple network paths 180, and to receive incoming data arriving over the network paths 180, selecting one of the network paths as a source of data to be provided to the client component 132*c*. In a similar manner, the link bonding server 140*s* is configured to direct outgoing data (from the server component 132*s*) over the network paths 180, and to receive incoming network data arriving over the same network paths 180, selecting one of the network paths 180 as a source of data to be provided to the server component 132*s*. In some examples, the link bonding client 140*c* and the link bonding service 140*s* operate at the data link layer (layer 2) of the OSI (Open Systems Interconnection) model, but this is not required. Although the micro-VPN client component 132*c* and link bonding client component 140*c* are shown herein as software libraries, they may alternatively be implemented at least in part using hardware and/or firmware. Also, one should appreciate that the micro-VPN client and server and link bonding client and service are merely illustrative and are not intended to be limiting.

In an example, the application program 132 is a SaaS application. The client component 132*c* may be a web browser or other client-side program that runs web pages and/or other content downloaded from the server component 132*s*. In an example, the application program 132 is a workspace framework, i.e., a software environment that provides user access to multiple sub-applications from a single interface. Such sub-applications run within the workspace framework, with incoming and outgoing data of those sub-applications passing through the tunnel 134 via the link bonding component 140*c*. According to some examples, the tunnel 134 applies to all application traffic to and from the application framework.

In example operation, user 102 of the client device 110 launches the client component 132*c*, e.g., by clicking or tapping a shortcut or by navigating in a browser. Based on previously-established associations 114, the client component 132*c* connects over the network 170 to the server component 132*s* and the tunnel 134 is established by action of the micro-VPN client 134*c* and the micro-VPN server 134*s*. The link bonding client 140*c* and the link bonding service 140*s* may then exchange messages 148 through the tunnel 134. The link bonding client 140*c* uses the messages 148 as a basis for measuring network performance over the paths 180. For example, sensor 144 measures network speed, e.g., as round-trip delay (using a ping utility), bandwidth, or the like. In an example, sensor 144 separately measures network speed or bandwidth over each of the paths 180 and may repeat its measurements more or less continuously, or at regular intervals, such as once every 50 ms (milliseconds). Although messages 148 are shown as a dotted line that directly connects the link bonding client 140*c* and server 140*s*, such messages in actuality pass through the network 170, e.g., via client and server-side drivers 160, and through any supporting infrastructure for each path 180 (e.g., cell phone towers, routers, Internet service providers, and so forth). In this manner, sensor 144 obtains real-time measurements of each path 180. In some examples, the sensor 144 identifies a selected path 144*a*, i.e., one of the paths 180 that provides the highest speed, bandwidth, consistency, economy, and/or the like, and alerts the link bonding service 140*s* on the server 120 of the identity of the selected path 144*a*, e.g., in an indicator, sent over the network 170, that identifies the selected path 144*a*.

As the user 102 operates the GUI 118 to control the application 132, the client 110 sends application data 162 to the network 170 over all paths 180, at substantially the same time and in parallel. For example, the link bonding client 140*c* passes the outgoing application data 162 to the TCP/IP driver 150*c*. The TCP/IP driver 150*c* uses multi-path routing to forward the application data to the Ethernet driver 160*a*, the Wi-Fi driver 160*b*, and the cellular data driver 160*c*. The client device 110 then sends out the packets 162*a*, 162*b*, and 162*c* via the Ethernet port, the Wi-Fi antenna, and the cell phone antenna. Packets 162*a*, 162*b*, and 162*c* all convey the same data 162 and pass through the network 170 in parallel and at the same time, or nearly so, with any differences among them deriving from differing delays along the paths 180. In an example, all application data 162 sent through all paths passes through the tunnel 134.

At the server 120, packets 162*a*, 162*b*, and 162*c* arrive at driver 160*a* and pass to the TCP/IP driver 150*s* and then to the link bonding service 140*s*. The link bonding service 140*s*, having obtained the identity of the selected path 144*a* based on the indicator sent from the client device 110, proceeds to discard all packets arriving over all of the other paths. For example, if the Ethernet path 180*a* was established as the selected path 144*a*, then the link bonding service 140*s* would discard all packets 162*b* and 162*c*, allowing only packets 162*a* to pass to the server component 132*s*. One should appreciate that the server 120 receives packets 162 via all paths 180, even if the server 120 includes only an Ethernet connection, as the packets 162 originate from different sources and travel through different paths 180 on their way to the server 120.

As shown at the bottom of FIG. 1, a packet 164, which is intended to be representative of all packets, includes a sequence identifier 164*a* and a payload 164*b*. The sequence identifier 164*a* is unique to each packet, but duplicates of the same packet having the same sequence identifier 164*a* may be sent over different paths 180. In one example, the link bonding service 140*s* discards arriving packets based on matching of sequence identifiers 164*a*. For example, the link bonding service 140*s* maintains a list of sequence identifiers 164*a* of all recently received packets and discards redundant packets having the same sequence identifiers 164*a* as those already on the list. The link bonding service 140*s* may use other approaches for distinguishing packets. For example, particular port designations or other designators in the packet may identify the path 180 over which the packet was transmitted. In such cases, the link bonding service 140*s* may discard packets whose port designations or other designators do not match that of the selected path 144*a*.

When the server 120 sends application data 162 to the client device 110, the link bonding service 140*s* passes the application data to the TCP/IP driver 150*s* and through the Ethernet driver 160*d* to the network 170. The server 120 sends the same application data redundantly in packets directed to all paths 180, such that the same packets arrive at the client device 110 via all of the paths 180 in parallel. The server 120 thus sends packets via all paths 180, even though the server 120 may connect to the network 170 using Ethernet only.

Drivers 160*a*, 160*b*, and 160*c* on the client device 110 receive the packets 162 and pass them to the TCP/IP driver 150*c*, which passes them to the link bonding client 140*c*. A selector 142 in the link bonding client 140*c* assigns the selected path 144*a* as the source of packets from the server component 132*s*. The selector discards packets 162*d* from all paths not designated as the selected path 144*a*, and passes the packets from the selected path 144*a* to the client component 132*c*. In an example, the selector 142 identifies packets arriving over the selected path 144*a* using the same techniques described above in connection with the server.

In an example, the sensor 144 continuously or repeatedly monitors network speed over the paths 180. If another path performs better than the current selected path 144*a*, e.g., in terms of speed, economy, etc., then the link bonding client 140*c* may select the better-performing path as a new selected path 144*a* and communicate the new selected path 144*a* to the link bonding service 140*s*. In a particular example, only Wi-Fi and LTE paths are available. The link bonding service 140*s* may then select Wi-Fi by default. If Wi-Fi speed falls below a designated threshold 146, the link bonding client 140*c* may choose LTE as the new selected path 144*a*. In some examples, the link bonding client 140*c* only switches to LTE when the current Wi-Fi speed drops below the current LTE speed. If Wi-Fi speed later recovers, the link bonding client 140*c* may reassign the selected path 144*a* to Wi-Fi. The assignment of selected path 144*a* is consequential in that it determines which packets are passed to the client component 132*c* and which packets are discarded. It may also determine which packets the link bonding service 140*s* on the server 120 passes to the server component 132*s* and which packets it discards. In an example, the assignment of the selected path 144*a* does not affect outgoing data transmitted by the client 110 or the server 120, however, as transmission is conducted over all paths 180 in parallel, regardless of the current selected path 144*a*.

With the arrangement as described, the client device 110 monitors speed of the paths 180 and selects the selected path 144*a* at any given time. If Wi-Fi suddenly becomes weak, e.g., because the user 102 has moved into a Wi-Fi dead spot, operation seamlessly and transparently switches to LTE (or to some other path). When the user 102 comes back into an active Wi-Fi area, operation seamlessly and transparently switches back to Wi-Fi. The user 102 need never know that the switching has occurred and typically experiences no disruption in service.

In some examples, the client 110 may save power and/or cost by temporarily shutting down the cellular data connection. For example, if Wi-Fi signal strength and/or speed as measured by sensor 144 are consistently high, the client 110 may temporarily close the LTE connection and proceed with Wi-Fi-only communications. Speed testing by sensor 144 may continue, however, and if Wi-Fi speed or signal strength starts to decline, the client 110 may reestablish the LTE connection. Preferably, the client 110 reconnects via LTE before the Wi-Fi signal becomes unusable, such that switching from Wi-Fi to LTE can proceed seamlessly prior to complete loss of the Wi-Fi signal. In some examples, the GUI 118 includes a control that allows the user 102 to turn off an undesired path. For example, if the user 102 is in an area with a strong Wi-Fi signal and does not intend to move during the course of a session, the user 102 might operate the GUI 118 to turn off LTE, thereby reducing power consumption associated with LTE processing and possibly reducing costs, which may be based on minutes used.

One should appreciate that the choice of selected path 144*a* may be based on a variety of factors. These may include, for example, speed, bandwidth, round-trip time, variability in network strength, interference (e.g., as measured based on numbers of dropped packets), and cost. Such factors may be combined in any suitable way, such as using combinatorial logic, weighted sums, fuzzy logic, machine learning, neural nets, and the like. Although the selected path 144*a* may be the fastest path in many cases, this is not required. For example, a slower path that is still fast enough to provide good user experience might be chosen as the selected path 144*a* if it is inexpensive to use and/or has other advantages.

Although a main operating mode of embodiments hereof is to keep multiple network paths active at the same time, such embodiments are not required to work this way all the time. For example, if a network path, such as Wi-Fi, is found to provide a consistently strong signal and is free to use, Wi-Fi may be chosen as the selected path 144*a* and operation over other network paths may be shut down. In a like manner, network paths that require high power consumption may be shut down temporarily to conserve battery life of the client device 110. Any paths 180 that have been shut down may be revived if the sensor 144 detects a drop in performance of the selected path 144*a*.

Further, although a single selected path 144*a* has been described, some embodiments allow for multiple selected paths, such as one for download to the client device 110 and another for download to the server 120. Accordingly, the selector 142 in the client device 110 chooses the selected path for the client device, whereas a similar selector (not shown) in the server 120 chooses the selected path for the server 120. Allowing selected paths to differ for client and server reflects differences in upload versus download performance, which is common to many types of network paths. In these circumstances, measurements used as a basis for choosing the selected paths may be based on unidirectional delays rather than on round-trip delays. According to some variants, a separate computer or other facility may monitor network speed or bandwidth on behalf of the client device 110 and/or server 120.

Figure 2:
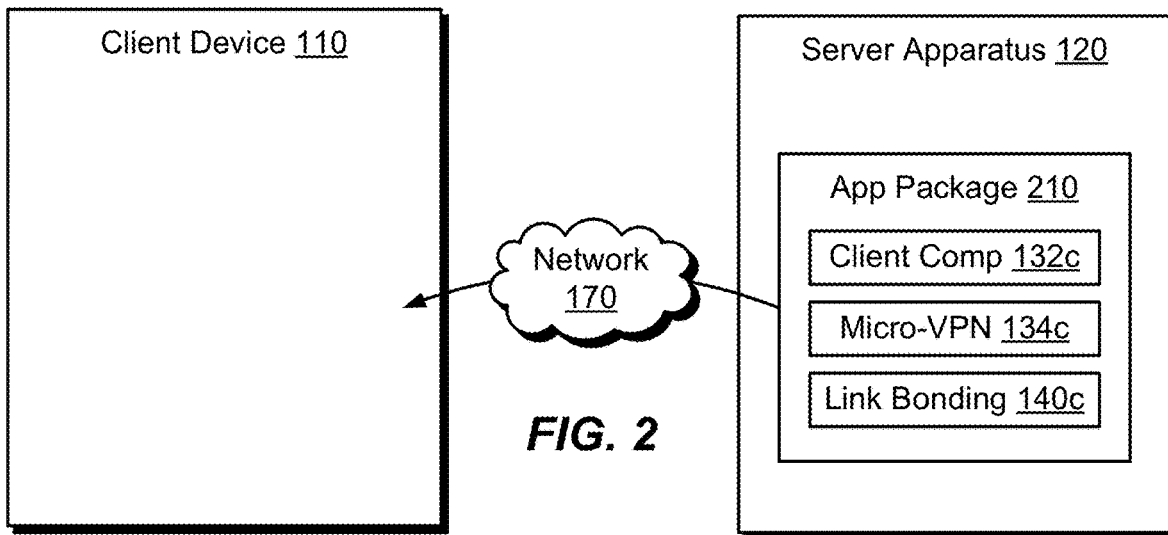
FIG. 2 is a block diagram showing an example arrangement for downloading a SaaS (Software as a Service) application from a server to a client.

FIG. 2 shows an example arrangement for installing an application program on the client device 110. Here, the server 120 stores a downloadable application package 210, which may be provided, for example, as a compressed archive, and which includes code for implementing the client component 132*c*, the micro-VPN client 134*c*, and the link bonding client 140*c*. To install the application program 132, the client device 110 contacts the server 120, e.g., via a website, and downloads the application package 210 to the client device 110 over the network 170. The client device 110 then opens the application package 210, decompresses any compressed contents, and installs the components. As all three components 132c, 134c, and 140c are provided together in a single package 210, the client device 110 is able to install all necessary components for supporting encrypted, multipath operation of the application program 132 via a single download.

Figure 3:
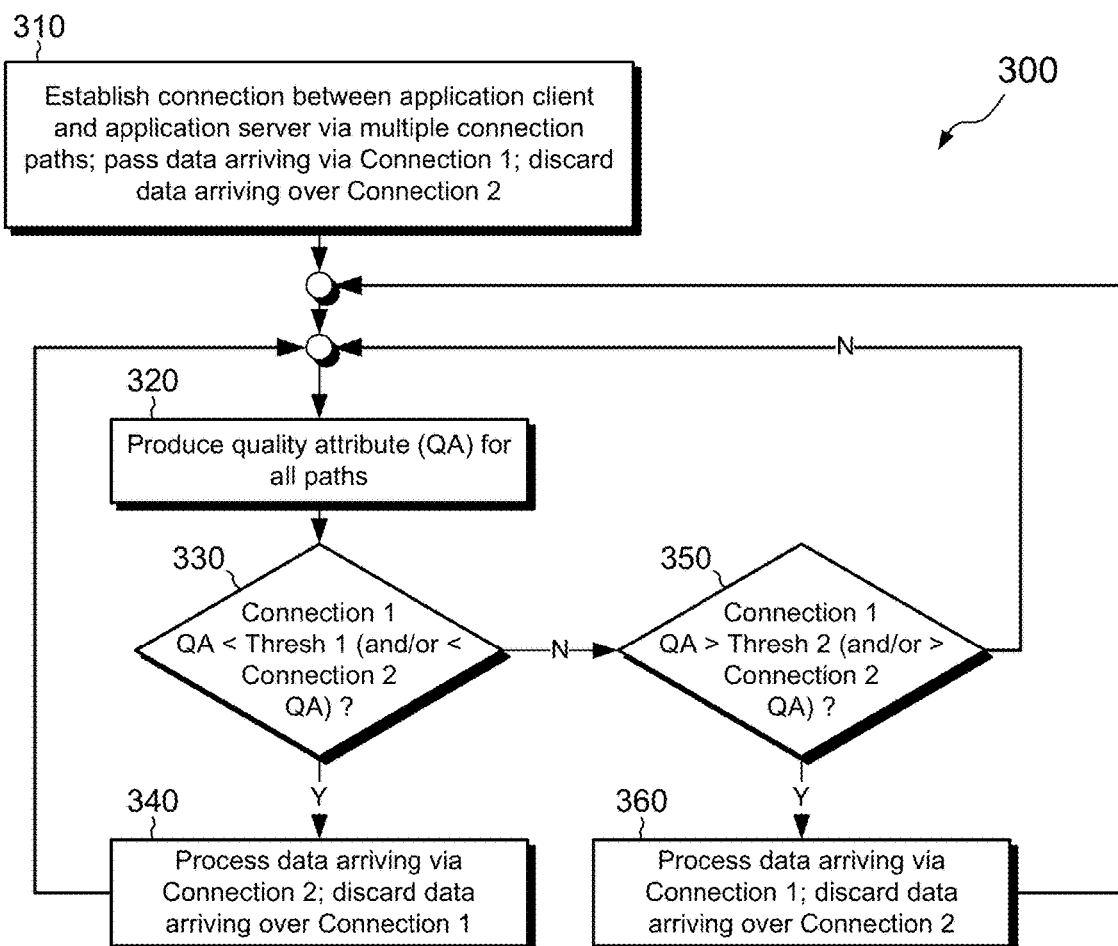
FIG. 3 is a flowchart showing an example method for operating a client and/or server in the environment of FIG. 1.

FIG. 3 shows an example method 300 for seamlessly and transparently switching between two connection paths, such as Wi-Fi and LTE, based on a quality attribute, which may itself be based on speed, bandwidth, network consistency, and/or cost; i.e., any of the factors described above for choosing the selected path 144a. Although the method 300 focuses on two connection paths 180, the method 300 may be extended to any number of such paths. Also, although the depicted acts are shown in a particular order, the order may be varied and some acts may be performed simultaneously.

At 310, a communication session is established between the application client 132c and the application server 132s, e.g., as a result of the user 102 launching the client component 132c. In an example, the communication session takes place via the tunnel 134 established between the micro-VPN client 134c and the micro-VPN server 134s. A respective network connection is configured via each connection path 180, and all communications between the client component 132c and the server component 132s pass through the tunnel 134, for all paths 180. The link bonding client 140c identifies a currently selected path 144a and proceeds to pass data (e.g., packets) that arrive via that selected path 144a to the client component 132c. Thus, the link bonding client 140c uses the selected path 144a as its sole source for all incoming application data 162 and discards data 162 arriving via the other paths. In an example, prior to the sensor 144 making any network measurements, the link bonding service 140c defaults to Wi-Fi as the initial selected path 144a, switching to another path only if no Wi-Fi signal is detected.

At 320, the sensor 144 in the link bonding client 140c measures the connections over all paths 180, e.g., by using ping commands, bandwidth measurements, and/or other approaches, and produces a quality attribute (QA) for each connection path 180. In some examples, the quality attribute is based solely on speed of the respective path. In other examples, the quality attribute is based on any combination of factors, which may include speed, bandwidth, cost, and/or consistency, for example.

At 330, the link bonding client 140c determines whether the quality attribute of the Wi-Fi path (Connection 1) has fallen below a threshold 146 (Thresh 1). The threshold may be predetermined or dynamically established, for example. The link bonding client 140c may also determine whether the quality attribute of Wi-Fi is less than that of LTE (Connection 2). The link bonding client 140c may apply these determinations in the alternative or in any combination.

If the quality attribute of Wi-Fi has fallen below Thresh 1 and/or below that of LTE, then operation proceeds to 340, whereupon the link bonding client 140c proceeds to process data arriving via LTE, discarding any data arriving via Wi-Fi. The link bonding client 140c may communicate this change in an attribute sent to the link bonding service 140s, which may also process arriving data via the LTE path, discarding data arriving via Wi-Fi. Operation then returns to 320, whereupon production of quality attributes and determinations are repeated.

At 330, if the quality attribute for Wi-Fi has not fallen below Thresh 1 and/or below that of LTE, then operation proceeds instead to 350, whereupon the link bonding client 140c determines whether the quality attribute of the Wi-Fi path (Connection 1) exceeds a second threshold (Thresh 2, which is preferably slightly higher than Thresh 1) and/or exceeds the quality attribute of LTE. If not, operation returns to 320; otherwise, operation proceeds to 360, whereupon the link bonding client 140c proceeds to process data arriving via Wi-Fi, discarding any data arriving via LTE. As before, the link bonding client 140c may communicate this change to the link bonding server 140s, which may also process data arriving via the Wi-Fi path, discarding data arriving via LTE. Operation then returns to 320, where the above-described acts are repeated. Thresh 2 may be predetermined or dynamically established, for example.

Operation may proceed in this fashion indefinitely, as long as the application program 132 continues to run. A rationale for making Thresh 2 slightly higher than Thresh 1 is to prevent operation from chattering between sources when quality attributes are close to Thresh 1. If this is not a concern, then Thresh 2 may simply be set to Thresh 1 (i.e., the same threshold may be used for both). One should appreciate that Thresh 1 and Thresh 2 may be established in any suitable way. For example, Thresh 1 and Thresh 2 may be established dynamically based on user activity and/or the nature of the application 132. For instance, the thresholds may be set to lower values if the application 132 exchanges relatively little data, such that a lower level of network performance does not impair user experience. Conversely, the thresholds may be set to higher values if more bandwidth-intensive applications are being run.

FIGS. 4a-4d show various screenshots 118a-118d, which represent portions of the GUI 118 as rendered by the client component 132s of the application program 132, and as viewed on the display 116 of the client device 110. One may recognize the layout of the depicted GUIs as that of a common smartphone app; however, the GUIs 118a-118d are not limited to smartphone applications. For instance, screenshots 118a-118d may be displayed on a laptop computer or on any other computing device. The laptop may have a Wi-Fi connection and may be tethered, via Bluetooth, to a smart phone that has an LTE connection (tethering is a well-known feature of many smart phones that allows sharing of the smartphone's data plan via a PAN—Personal Area Network).

Figure 4A:
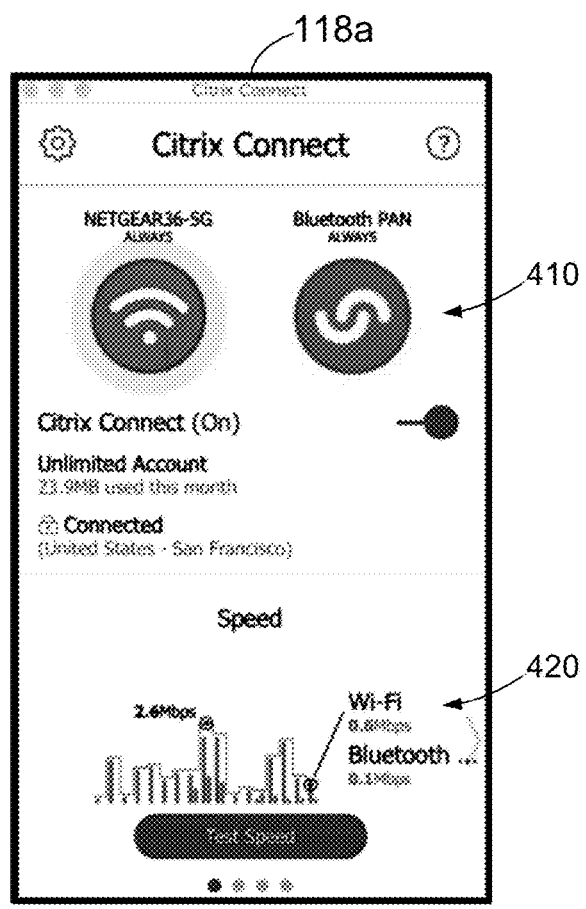

As shown in FIG. 4a, the GUI 118a displays icons 410 for currently active connection paths 180. Icons 410 for Wi-Fi and Bluetooth PAN are specifically shown, indicating that the client device 110 is connected to the Internet via both Wi-Fi and LTE (LTE connection is achieved via the Bluetooth-tethered smart phone). The GUI 118 displays a speed indicator 420, which shows network speed (in megabits per second) for both paths (0.6 Mbps for Wi-Fi and 0.1 Mbps for LTE), e.g., as measured by the sensor 144 in the link bonding client 140c.

Figure 4B:
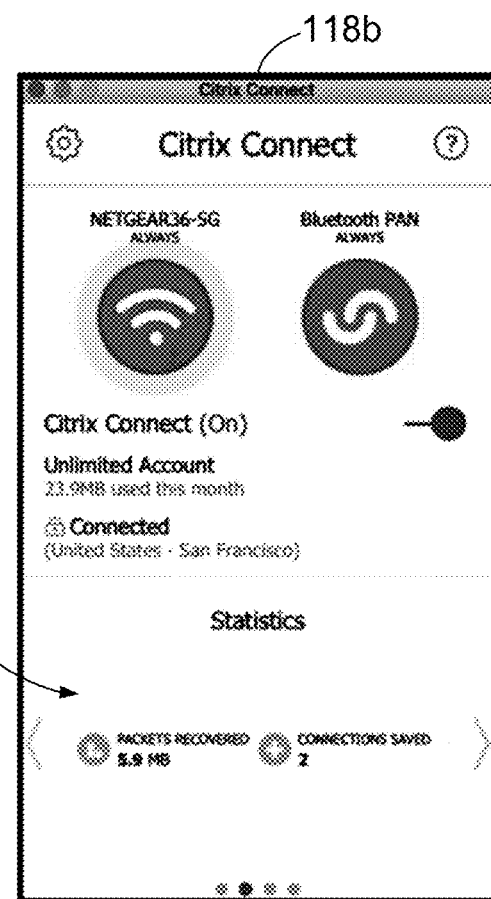

FIGS. 4b-4d show additional information, including, in FIG. 4b, statistics 430 for packets recovered (5.9 MB, the number of packets recovered by switching paths) and connections saved (2; the number of times a lost connection was avoided by switching paths). FIG. 4c shows a usage breakdown 440 (how much data from each path has been used), and FIG. 4d shows connection quality 450, in terms of both latency and loss. In some embodiments, FIGS. 4a-4d represents portions of a larger GUI 118.

Figure 5:
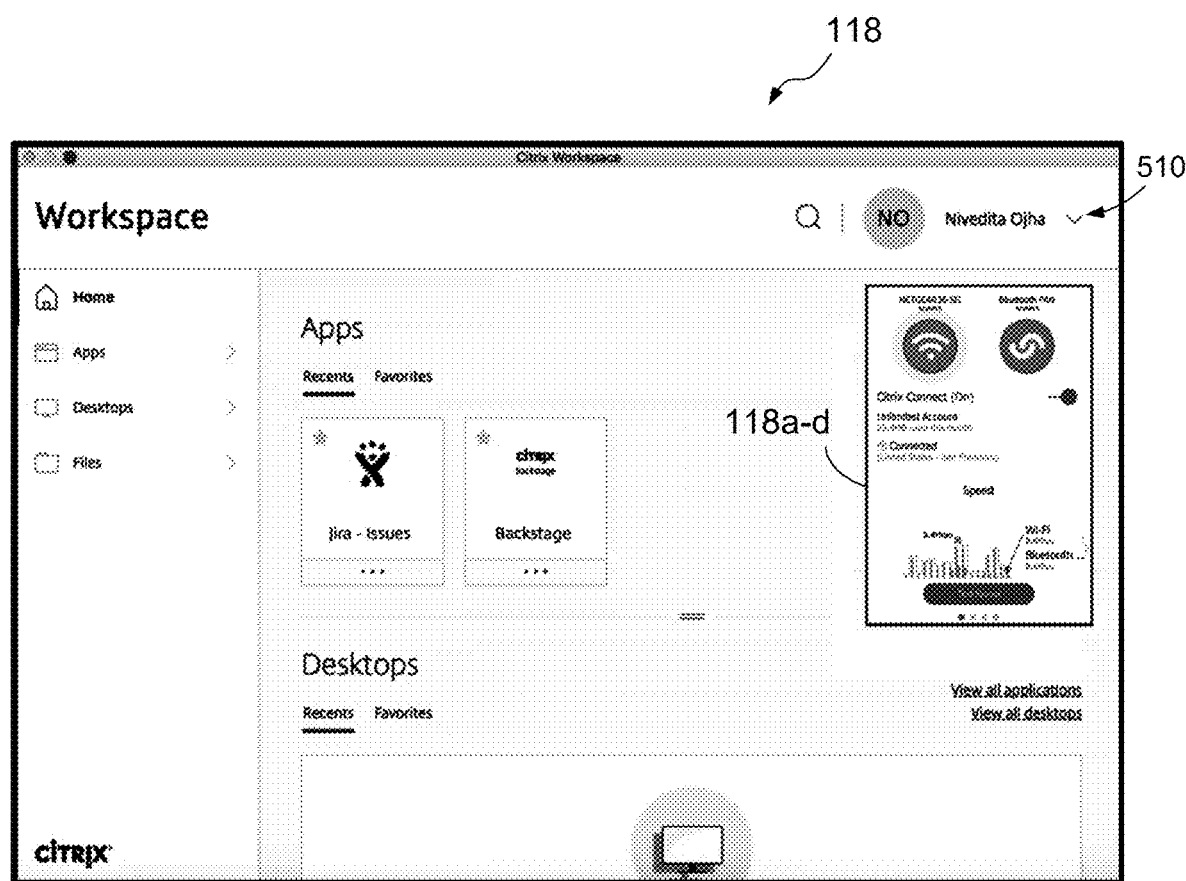
FIG. 5 is a simulated screenshot of a GUI of a SaaS workspace application.

FIG. 5 shows an example of such embodiments, in which an overall GUI 118 includes the above-described GUI portions 118a-118d. For example, user 102 may invoke the GUI portions 118a-118d by clicking an arrow 510 on the overall GUI 118. The overall GUI 118 provides a user interface for the application program 132, which in this example is a workspace framework application. The workspace framework application runs as a SaaS application, e.g., in a web browser or other container, and enables the user 102 to select and run any of its registered sub-applications. The registered sub-applications all run within the context of the application program 132, such that they all communicate via the micro-VPN client 134c and the link bonding client 140c. The depicted arrangement thus uniquely supports operation of a SaaS application over a micro-VPN using multiple paths 180, which are seamlessly switched to maintain a quality connection, even in the presence of dead spots.

Figure 6:
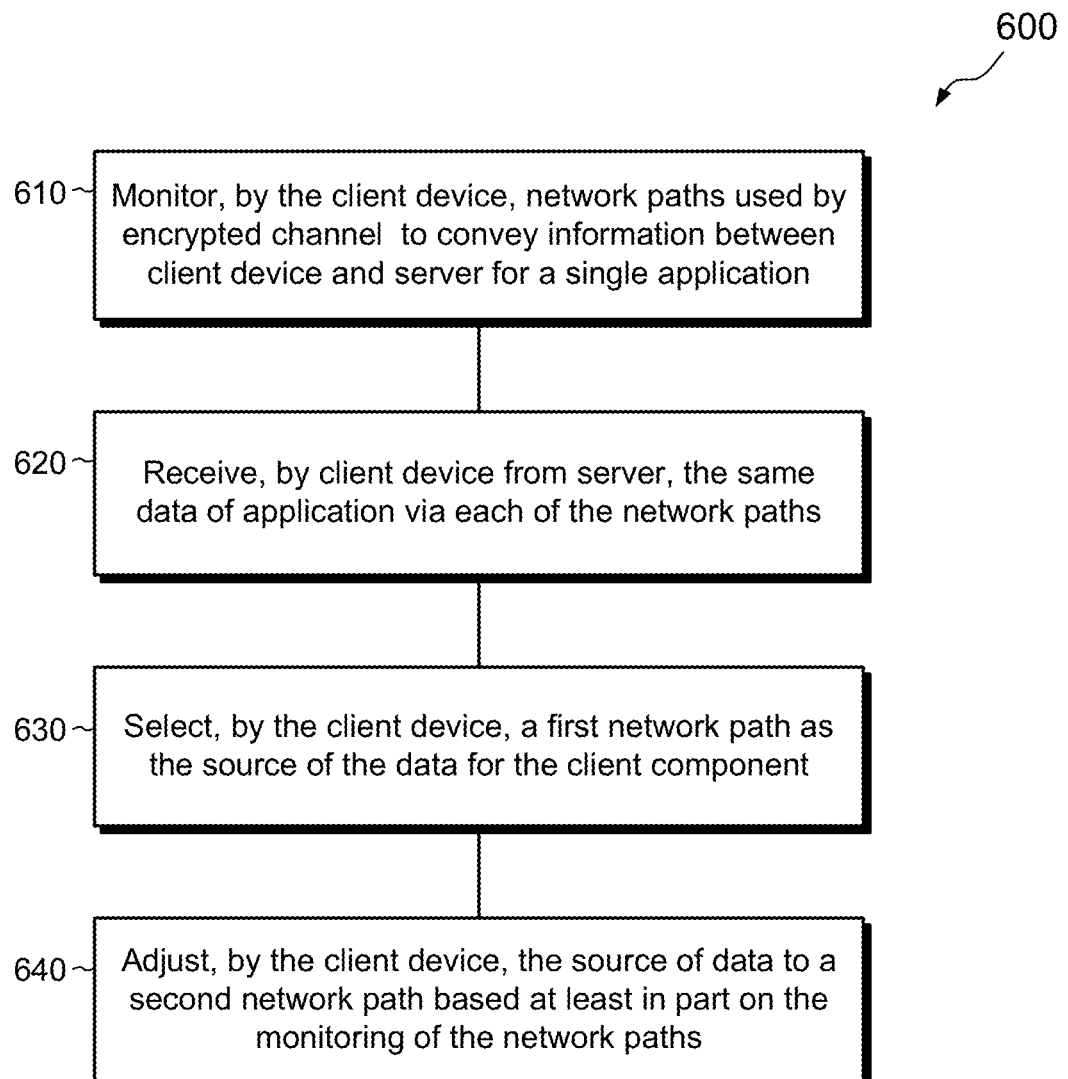
FIGS. 6-8 are flowcharts showing example methods conducted by the client device, by the server, and by a system that includes both the client device and the server.
Figure 7:
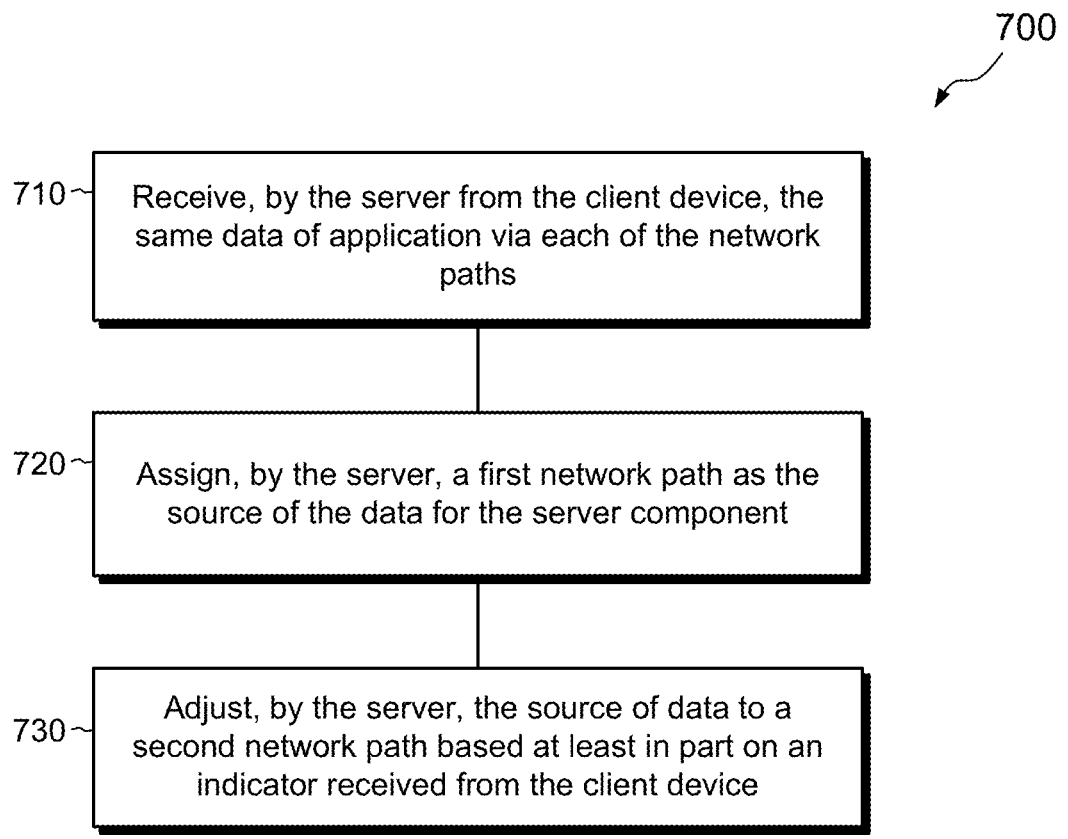
Figure 8:
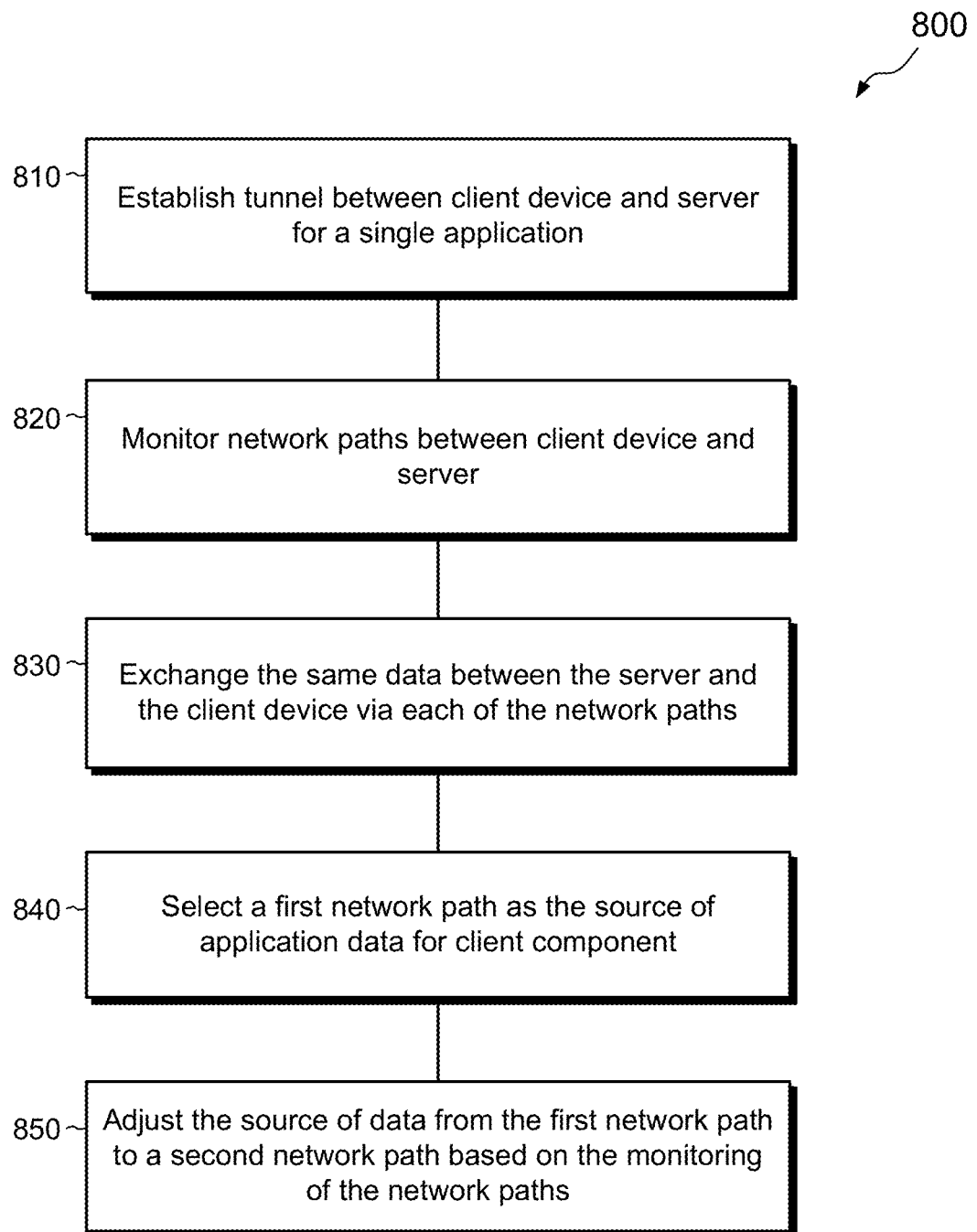

FIGS. 6-8 show example methods 600, 700, and 800 that may be carried out in connection with the environment 100. The method 600 can be performed, for example, by the software constructs described in connection with FIG. 1, which reside in the memory 130c of the client device 110 and are run by the set of processors 114c. The method 700 may be performed, for example, by the software constructs that reside in the memory 130s of the server 120 and are run by the set of processors 114s. The method 800 may be performed by the software constructs that reside in both the client device 110 and the server 120. The various acts of methods 600, 700, and 800 may be ordered in any suitable way. Accordingly, embodiments may be constructed in which acts are performed in orders different from those shown, which may include performing some acts simultaneously.

In FIG. 6, the method 600 may be performed by the client device 110. At act 610, the client device 110 monitors a plurality of network paths 180 used by an encrypted channel 134 configured to convey information between the client device 110 and a server 120 for a single application 132.

At 620, the client device 110 receives data 162 of the single application 132 from the server 120 via each of the plurality of network paths 180. The data 162 received from each of the plurality of network paths is the same data.

At 630, the client device 110 selects a first network path 144a of the plurality of network paths 180 as a source of the data 162 for a client component 132c on the client device 110. For example, the selector 142 in the link bonding client 140c passes packets arriving over the selected path 144a and discards packets arriving over other paths.

At 640, the client device 110 adjusts the source of data for the client component 132c from the first network path to a second network path of the plurality of network paths based at least in part on the monitoring of the plurality of network paths, 180 so as to prevent delay in reception of data caused by a reduction of network continuity of the first network path.

Turning now to FIG. 7, the method 700 may be performed by the server 120. At 710, the server 120 receives application data from the client device 100 over an encrypted channel 134 provided between the server 120 and the client device 110 for a single application 132. The application data 162 is received via a plurality of network paths 180 in parallel, with the plurality of network paths all conveying the same application data.

At 720, the server assigns a first network path of the plurality of network paths 180 as a source of the application data 162 for a server component 132s running on the server 120.

At 730, the server 120 adjusts the source of the application data 162 for the server component 132s from the first network path to a second network path of the plurality of network paths. The adjusting is based at least in part on an indicator received from the client device 110 and acts to prevent delay in reception of data caused by a reduction of network continuity of the first network path.

Turning now to FIG. 8, the method 800 may be performed by both the client device 110 and the server 120. At 810, an encrypted channel 134 is established between the client device 110 and the server 120. The encrypted channel 134 is configured to convey encrypted communications for a single application 132. The encrypted channel 134 may be established under direction of the client device 110, the server 120, or based on coordination between the client device 110 and the server 120.

At 820, a plurality of network paths 180 used by the encrypted channel 134 between the client device 110 and the server 120 are monitored. For example, the client 110, the server 120, and or some separate computer or facility measures network speed, bandwidth, and/or other factors pertaining to each of the plurality of network paths 180.

At 830, the server 120 transmits a set of application data 162 of the single application 132 to the client device 110 over the encrypted channel 134 via each of the plurality of network paths 180. Each of the plurality of network paths 180 conveys the same set of application data 162. When the client device 110 is the one sending the data, the client device 110 transmits a set of application data 162 of the single application 132 to the server 120 over the encrypted channel 134 via each of the plurality of network paths 180, with each of the plurality of network paths 180 conveying the same set of application data 162.

At 840, the client device 110 selects a first network path of the plurality of network paths 180 as a source of application data 162 for the client component 132c running on the client device 110. When the server 120 is the one receiving the data, the server 120 selects a first network path of the plurality of network paths 180 as a source of application data 162 for the server component 132s running on the server 120.

At 840, the client device 110 adjusts the source of data from the first network path to a second network path of the plurality of network paths based at least in part on the monitoring of the plurality of network paths, so as to prevent delay in communicating data between the client device and the server caused by a reduction of network continuity of the first path. When the server 120 is receiving the data, the server 120 adjusts the source of data from the first network path to a second network path of the plurality of network paths based at least in part on the monitoring of the plurality of network paths, so as to prevent delay in communicating data between the server and the client device caused by a reduction of network continuity of the first path.

Figure 9:
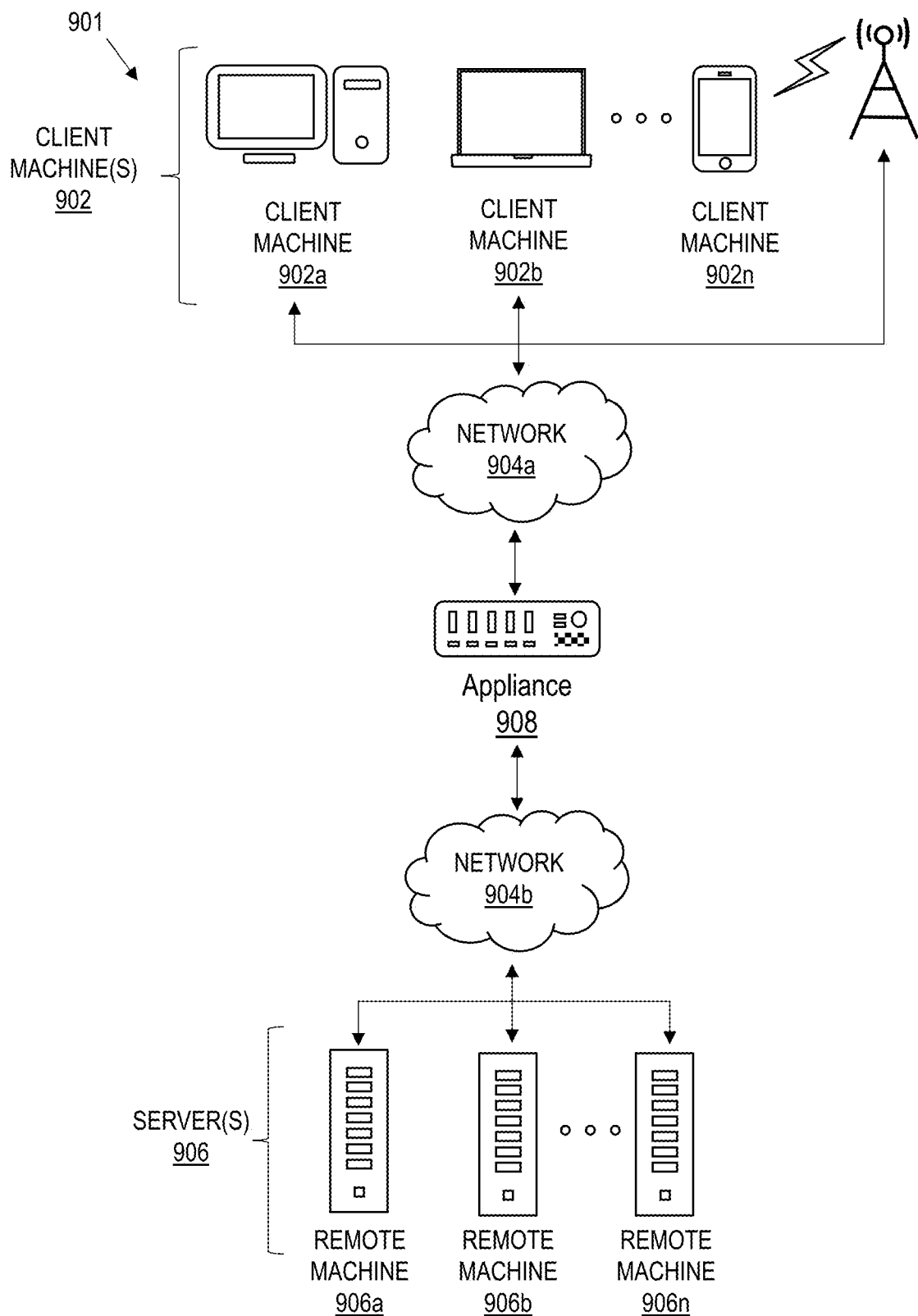
FIG. 9 is a block diagram that shows a non-limiting network environment in which various aspects of the disclosure may be implemented.

Referring now to FIG. 9, a non-limiting network environment 901 in which various aspects of the disclosure may be implemented includes one or more client machines 902A-902N, one or more remote machines 906A-906N, one or more networks 904, 904', and one or more appliances 908 installed within the computing environment 901. The client machines 902A-902N communicate with the remote machines 906A-906N via the networks 904, 904'.

In some embodiments, the client machines 902A-902N (which may be similar to client device 110) communicate with the remote machines 906A-906N (which may be similar to server 120) via an intermediary appliance 908. The illustrated appliance 908 is positioned between the networks 904, 904' and may also be referred to as a network interface or gateway. In some embodiments, the appliance 908 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 908 may be used, and the appliance(s) 908 may be deployed as part of the network 904 and/or 904'.

The client machines 902A-902N may be generally referred to as client machines 902, local machines 902, clients 902, client nodes 902, client computers 902, client devices 902, computing devices 902, endpoints 902, or endpoint nodes 902. The remote machines 906A-906N may be generally referred to as servers 906 or a server farm 906. In some embodiments, a client device 902 may have the capacity to function as both a client node seeking access to resources provided by a server 906 and as a server 906 providing access to hosted resources for other client devices 902A-902N. The networks 904, 904' may be generally referred to as a network 904. The networks 904 may be configured in any combination of wired and wireless networks.

A server 906 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 906 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 906 may execute a remote presentation services program or other program that uses a thin-client or a remote-display protocol to capture display output generated by an application executing on a server 906 and transmit the application display output to a client device 902.

In yet other embodiments, a server 906 may execute a virtual machine providing, to a user of a client device 902, access to a computing environment. The client device 902 may be a virtual machine. The virtual machine may be managed by, for example, a hypervisor, a virtual machine manager (VMM), or any other hardware virtualization technique within the server 906.

In some embodiments, the network 904 may be: a local-area network (LAN); a metropolitan area network (MAN); a wide area network (WAN); a primary public network 904; and a primary private network 904. Additional embodiments may include a network 904 of mobile telephone networks that use various protocols to communicate among mobile devices. For short range communications within a wireless local-area network (WLAN), the protocols may include 802.11, Bluetooth, and Near Field Communication (NFC).

Figure 10:
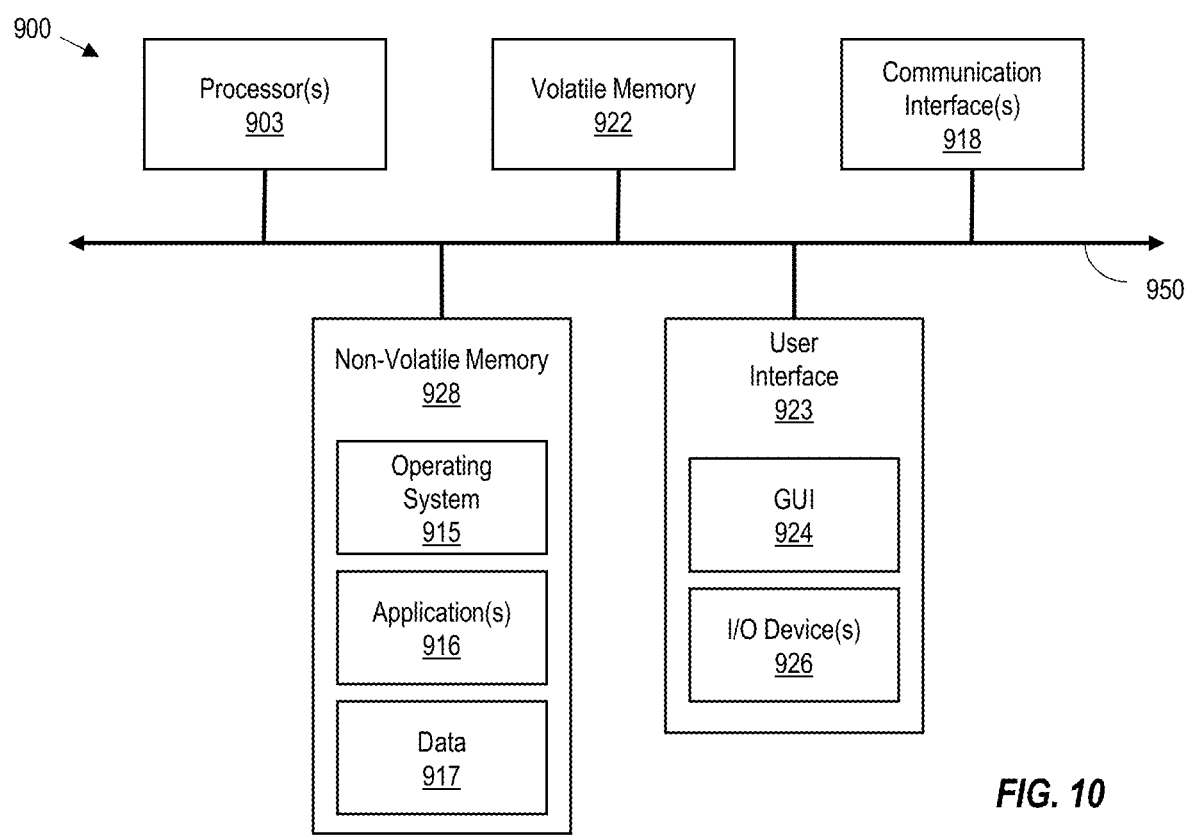
FIG. 10 is a block diagram of a computing device useful for practicing an embodiment of client devices, appliances, and/or servers.

FIG. 10 depicts a block diagram of a computing device 900 useful for practicing an embodiment of client devices 902, appliances 908 and/or servers 906. The computing device 900 includes one or more processors 903, volatile memory 922 (e.g., random access memory (RAM)), non-volatile memory 928, user interface (UI) 923, one or more communications interfaces 918, and a communications bus 950.

The non-volatile memory 928 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 923 may include a graphical user interface (GUI) 924 (e.g., a touchscreen, a display, etc.) and one or more input/output (I/O) devices 926 (e.g., a mouse, a keyboard, a microphone, one or more speakers, one or more cameras, one or more biometric scanners, one or more environmental sensors, and one or more accelerometers, etc.).

The non-volatile memory 928 stores an operating system 915, one or more applications 916, and data 917 such that, for example, computer instructions of the operating system 915 and/or the applications 916 are executed by processor(s) 903 out of the volatile memory 922. In some embodiments, the volatile memory 922 may include one or more types of RAM and/or a cache memory that may offer a faster response time than a main memory. Data may be entered using an input device of the GUI 924 or received from the I/O device(s) 926. Various elements of the computer 900 may communicate via the communications bus 950.

The illustrated computing device 900 is shown merely as an example client device or server, and may be implemented by any computing or processing environment with any type of machine or set of machines that may have suitable hardware and/or software capable of operating as described herein.

The processor(s) 903 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 903 may be analog, digital or mixed-signal. In some embodiments, the processor 903 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 918 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 900 may execute an application on behalf of a user of a client device. For example, the computing device 900 may execute one or more virtual machines managed by a hypervisor. Each virtual machine may provide an execution session within which applications execute on behalf of a user or a client device, such as a hosted desktop session. The computing device 900 may also execute a terminal services session to provide a hosted desktop environment. The computing device 900 may provide access to a remote computing environment including one or more applications, one or more desktop applications, and one or more desktop sessions in which one or more applications may execute.

An improved technique has been described for managing communication over a network 170. The technique maintains multiple network paths 180 simultaneously, exchanging the same data 162 redundantly through all network paths 180 and allowing a receiver (e.g., selector 142) to select one of the network paths 180 as its source of data. In the event that a first, currently-selected network path, such as Wi-Fi, becomes weak, the receiver 142 automatically and seamlessly switches its source of data to a second network path, such as LTE, while the first network path remains operational. Given that the second (LTE) network path is already on and is already conveying data, the transition is nearly instantaneous. User experience is greatly improved, as even highly interactive applications running in environments with inconsistent networks can remain fully functional with generally no downtime. Reliability and user experience are thereby enhanced.

The following paragraphs describe example implementations of methods, systems, and computer-readable media in accordance with the present disclosure.

According to some examples, a method includes monitoring, by a client device, a plurality of network paths that convey data between the client device and a server, the data being associated with a single application on the server. The method further includes receiving, by the client device, the data from the server via each of the plurality of network paths, the data received from each of the plurality of network paths being the same. The method still further includes selecting, by the client device, a first network path of the plurality of network paths from which to receive data to enable delivery of the single application on the server to the client device, and adjusting, by the client device, the selected network path from the first network path to a second network path of the plurality of network paths based at least in part on the monitoring of the plurality of network paths, so as to prevent delay in receipt of data from the server caused by a reduction of network continuity of the first network path.

A method may be performed as described above, and may further involve adjusting the selected network path from the first network path to the second network path is performed while both the first network path and the second network path are operational and conveying data.

Another method may be performed as described in any of the above paragraphs, and may further involve transmitting a set of application data to the server via both the first network path and the second network path, with the first network path and the second network path conveying the same set of application data in parallel.

A method may be performed as described in any of the above paragraphs, and may further include after adjusting the selected network path from the first network path to the second network path, discarding data of the single application arriving via the first network path.

A method may be performed as described in any of the above paragraphs, wherein the data of the single application arrives from the server in packets, each packet having a sequence identifier, and discarding data of the single application arriving via the first network path includes identifying a packet arriving via the first network path as redundant based on the sequence identifier of the packet matching the sequence identifier of a packet that arrived via the second network path.

A method may be performed as described in any of the above paragraphs, wherein the first network path is a Wi-Fi network path and the second network path is a cellular network path. According to some variants, the cellular network path is an LTE (Long-Term Evolution) network path.

A method may be performed as described in any of the above paragraphs and may further include measuring a speed of the first network path, wherein adjusting the selected network path from the first network path to the second network path is based at least in part on the speed of the first network path falling below a threshold.

A method may be performed as described in any of the above paragraphs and may further include measuring a speed of the second network path and measuring a speed of the second network path, wherein adjusting the selected network path from the first network path to the second network path is based on the speed of the second network path exceeding the speed of the first network path.

A method may be performed as described in any of the above paragraphs, wherein measuring the speed of the first network path includes measuring a round-trip transmission time between the client device and the server via the first network path.

A method may be performed as described in any of the above paragraphs and may further include downloading an application package from the server, the application package including (i) a client component of the application, (ii) a micro-VPN client component and (iii) a link-bonding client component. The micro-VPN client component is configured to establish an encrypted channel between the client component of the application and the application on the server. The link-bonding client component is configured to (i) transmit data from the client component of the application in parallel over the plurality of network paths and (ii) adjust the selected network path for the client component of the application based on the monitoring.

A method may be performed as described in any of the above paragraphs, wherein the encrypted channel is implemented with a virtual private network (VPN) that conveys information for the single application but for no other application running on the client device.

According to some examples, a client device includes control circuitry having a set of processors coupled to memory. The control circuitry is configured to (a) monitor a plurality of network paths that convey data between the client device and a server, the data being associated with a single application on the server, (b) receive the data from the server via each of the plurality of network paths, the data received from each of the plurality of network paths being the same, (c) select a first network path of the plurality of network paths from which to receive data to enable delivery of the single application on the server to the client device; and (d) adjust the selected network path from the first network path to a second network path of the plurality of network paths based at least in part on the monitoring of the plurality of network paths, so as to prevent delay in receipt of data from the server caused by a reduction of network continuity of the first network path.

A client device may be provided as described in any of the above paragraphs, wherein the control circuitry is further configured to adjust the selected network path from the first network path to the second network path while both the first network path and the second network path are operational and conveying data.

A client device may be provided as described in any of the above paragraphs, wherein the control circuitry is further configured to transmit a set of application data to the server via both the first network path and the second network path, the first network path and the second network path conveying the same set of application data in parallel.

A client device may be provided as described in any of the above paragraphs, wherein the control circuitry is further configured to discard data of the single application arriving via the first network path after adjusting the selected network path from the first network path to the second network path.

A client device may be provided as described in any of the above paragraphs, wherein the data of the single application arrives in packets, each packet having a sequence identifier, and the control circuitry is further configured to discard data of the single application arriving via the first network path by identifying a packet arriving via the first network path as redundant based on the sequence identifier of the packet matching the sequence identifier of a packet that arrived via the second network path.

A client device may be provided as described in any of the above paragraphs, wherein the control circuitry is further configured to measure a speed of the first network path and to adjust the selected network path from the first network path to the second network path based at least in part on the speed of the first network path being below a threshold.

A client device may be provided as described in any of the above paragraphs, wherein the control circuitry is further configured to measure a speed of the second network path and to adjust the selected network path from the first network path to the second network path based on the speed of the second network path exceeding the speed of the first network path.

A client device may be provided as described in any of the above paragraphs, wherein the control circuitry configured to measure the speed of the first network path is further configured to measure a round-trip transmission time between the client device and the server via the first network path.

A client device may be provided as described in any of the above paragraphs, wherein the control circuitry is further configured to download an application package from the server, the application package including (i) a client component of the application, (ii) a micro-VPN client component and (iii) a link-bonding client component, the micro-VPN client component configured to establish an encrypted channel between the client component of the application and the application on the server, the link-bonding client component configured to (i) transmit data from the client component of the application in parallel over the plurality of network paths and (ii) adjust the selected network path for the client component of the application based on the monitoring.

In some examples, computer program product includes a set of non-transitory, computer-readable media having instructions which, when executed by control circuitry of a client device, cause the client device to perform a method that includes (a) monitoring a plurality of network paths that convey data between the client device and a server, the data being associated with a single application on the server, (b) receiving the data from the server via each of the plurality of network paths, the data received from each of the plurality of network paths being the same, (c) selecting a first network path of the plurality of network paths from which to receive data to enable delivery of the single application on the server to the client device, and (d) adjusting the selected network path from the first network path to a second network path of the plurality of network paths based at least in part on the monitoring of the plurality of network paths, so as to prevent delay in receipt of data from the server caused by a reduction of network continuity of the first network path.

In some examples, a server method includes (a) receiving, by a server, application data from a client device for a single application, the application data received via a plurality of network paths in parallel, the plurality of network paths all conveying the same application data, (b) assigning a first network path of the plurality of network paths as a source of the application data for a server component running on the server, and (c) adjusting the source of the application data for the server component from the first network path to a second network path of the plurality of network paths based at least in part on an indicator received from the client device, so as to prevent delay in reception of data caused by a reduction of network continuity of the first network path.

A server method may be performed as described in the above paragraph and may further include adjusting the source of the application data from the first network path to the second network path while both the first network path and the second network path are operational and conveying the application data.

A server method may be performed as described in any of the above paragraphs and may further include transmitting a set of application data to the client device via both the first network path and the second network path, the first network path and the second network path conveying the same set of application data in parallel.

A server method may be performed as described in any of the above paragraphs and may further include after adjusting the source of the application data from the first network path to the second network path, discarding application data arriving via the first network path.

A server method may be performed as described in any of the above paragraphs, wherein the application data from the client device arrives in packets, each packet having a sequence identifier, and wherein discarding application data arriving via the first network path includes identifying a packet arriving via the first network path as redundant based on the sequence identifier of the packet matching the sequence identifier of a packet that arrived via the second network path.

A server method may be performed as described in any of the above paragraphs, wherein the first network path is a Wi-Fi network path and the second network path is a cellular network path. According to some variants, the cellular network path is an LTE (Long-Term Evolution) network path.

A server method may be performed as described in any of the above paragraphs and may further include adjusting the source of the application data from the first network path to the second network path is based at least in part on a speed of the first network path falling below a threshold.

A server method may be performed as described in any of the above paragraphs and may further include adjusting the source of application data from the first network path to the second network path is based on a speed of the second network path exceeding a speed of the first network path.

A server method may be performed as described in any of the above paragraphs and may further include adjusting the source of application data from the first network path to the second network path is based on the indicator received from the client device identifying the second network path as a currently selected network path.

A server method may be performed as described in any of the above paragraphs and may further include transmitting an application package to the client device, the application package including (i) a client component of the single application, (ii) a micro-VPN client component and (iii) a link-bonding client component, the micro-VPN client component configured to establish an encrypted channel between the single application on the server and the client component of the application, the link-bonding client component configured to (i) transmit data from the client component of the single application in parallel over the plurality of network paths and (ii) adjust a source of application data for the client component of the single application.

A server method may be performed as described in any of the above paragraphs, wherein the encrypted channel is implemented with a virtual private network (VPN) that conveys information for the single application but for no other application.

In some examples, a server includes server control circuitry having a set of processors coupled to memory. The server control circuitry is configured to: (a) receive application data from a client device for a single application, the application data received via a plurality of network paths in parallel, the plurality of network paths all conveying the same application data, (b) assign a first network path of the plurality of network paths as a source of the application data for a server component running on the server, and (c) adjust the source of the application data for the server component from the first network path to a second network path of the plurality of network paths based at least in part on an indicator received from the client device, so as to prevent delay in reception of data caused by a reduction of network continuity of the first network path.

A server may be provided as described in the above paragraph, wherein the server control circuitry is configured to adjust the source of the application data from the first network path to the second network path while both the first network path and the second network path are operational and conveying the application data.

A server may be provided as described in any the above paragraphs, wherein the server control circuitry is further configured to transmit a set of application data to the client device via both the first network path and the second network path, the first network path and the second network path conveying the same set of application data in parallel.

A server may be provided as described in any the above paragraph, wherein the server control circuitry is further configured to discard application data arriving via the first network path after adjusting the source of the application data from the first network path to the second network path.

A server may be provided as described in any the above paragraph, wherein the application data from the client device arrives in packets, each packet having a sequence identifier, and the server control circuitry configured to discard application data arriving via the first network path is further configured to identify a packet arriving via the first network path as redundant based on the sequence identifier of the packet matching the sequence identifier of a packet that arrived via the second network path.

A server may be provided as described in any the above paragraph, wherein the server control circuitry is configured to adjust the source of application data from the first network path to the second network path based at least in part on a speed of the first network path falling below a threshold.

A server may be provided as described in any the above paragraph, wherein the server control circuitry is further configured to adjust the source of data from the first network path to the second network path based on a speed of the second network path exceeding the speed of the first network path.

A server may be provided as described in any the above paragraph, wherein the server control circuitry is further configured to adjust the source of application data from the first network path to the second network path based on the indicator received from the client device identifying the second network path as a currently selected network path.

A server may be provided as described in any the above paragraph, wherein the server control circuitry is further configured to transmit an application package to the client device, the application package including (i) a client component of the single application, (ii) a micro-VPN client component and (iii) a link-bonding client component, the micro-VPN client component configured to establish an encrypted channel between the single application on the server and the client component of the application, and the link-bonding client component configured to (i) transmit data from the client component of the single application in parallel over the plurality of network paths and (ii) adjust a source of application data for the client component of the single application.

According to some examples, a computer program product includes a set of non-transitory, computer-readable media having instructions which, when executed by server control circuitry of a server, cause the server to perform a method that includes (a) receiving application data from a client device for a single application, the application data received via a plurality of network paths in parallel, the plurality of network paths all conveying the same application data, (b) assigning a first network path of the plurality of network paths as a source of the application data for a server component running on the server, and (c) adjusting the source of the application data for the server component from the first network path to a second network path of the plurality of network paths based at least in part on an indicator received from the client device, so as to prevent delay in reception of data caused by a reduction of network continuity of the first network path In some examples, a system method includes (a) establishing an encrypted channel between a client device and a server, the encrypted channel configured to convey encrypted communications for a single application, (b) monitoring a plurality of network paths used by the encrypted channel between the client device and the server, (c) transmitting, by the server, a set of application data of the single application to the client device over the encrypted channel via each of the plurality of network paths, each of the plurality of network paths conveying the same set of application data, (d) selecting, by the client device, a first network path of the plurality of network paths as a source of application data for a client component running on the client device, and (e) adjusting, by the client device, the source of data from the first network path to a second network path of the plurality of network paths based at least in part on the monitoring of the plurality of network paths, so as to prevent delay in communicating data between the client device and the server caused by a reduction of network continuity of the first path.

Having described certain embodiments, numerous alternative embodiments or variations can be made. For example, although the depicted embodiments provide for communications between a single client 110 and a single server 120, embodiments hereof are not limited to two machines. For example, multiple clients may run the application program 132 at the same time, in a collaborative session, communicating via a single server 120 or directly with one another, with each client acting as a server to each of the other clients. In this arrangement, each participating machine may be configured similarly to the others. For example, each participating machine, or any subset thereof, may connect to various paths 170 and may receive and transmit application data via any of such paths. Without limiting the generality of the foregoing, a particularly favorable use of the disclosed technology is in the area of web conferencing. For instance, a user can start a web conference connected to Wi-Fi at home on a smartphone, continue the conference, without interruption, using LTE on the drive to work, and then continue again using Wi-Fi at the office once the user has arrived at work.

Although features have been shown and described with reference to particular embodiments hereof, such features may be included and hereby are included in any of the disclosed embodiments and their variants. Thus, it is understood that features disclosed in connection with any embodiment are included in any other embodiment.

Further, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method, comprising:
a client device contacting a server via a website and downloading an application package from the server, the client device opening the downloaded application package, decompressing compressed contents of the application package, and installing components of the application package, the components of the application package including (i) a client component of an application, (ii) a micro-VPN client component and (iii) a link-bonding client component, the micro-VPN client component configured to establish an encrypted channel between the client component of the application and a single application on the server, the link-bonding client component configured to transmit data from the client component of the application in parallel over a plurality of network paths;
monitoring, by the client device, the plurality of network paths that convey data between the client device and the server, the data being associated with the single application on the server;
receiving, by the client device within the encrypted channel established by the micro-VPN client component, the data from the server via each of the plurality of network paths, the data received from each of the plurality of network paths being the same;
selecting, by the link-bonding client component of the client device, a first network path of the plurality of network paths from which to receive data to enable delivery of the single application on the server to the client device; and
adjusting, by the link-bonding client component of the client device, the selected network path from the first network path to a second network path of the plurality of network paths, while both the first network path and the second network path are operational and conveying data, based at least in part on the monitoring of the plurality of network paths, so as to prevent delay in receipt of data from the server caused by a reduction of network continuity of the first network path.

2. The method of claim 1, further comprising transmitting a set of application data to the server via both the first network path and the second network path, the first network path and the second network path conveying the same set of application data in parallel.

3. The method of claim 1, further comprising, after adjusting the selected network path from the first network path to the second network path, discarding data of the single application arriving via the first network path.

4. The method of claim 3, wherein the data of the single application arrives from the server in packets, each packet having a sequence identifier, and wherein discarding data of the single application arriving via the first network path includes identifying a packet arriving via the first network path as redundant based on the sequence identifier of the packet matching the sequence identifier of a packet that arrived via the second network path.

5. The method of claim 1, wherein the first network path is a Wi-Fi network path and the second network path is a cellular network path.

6. The method of claim 5, wherein the cellular network path is an LTE (Long-Term Evolution) network path.

7. The method of claim 1, further comprising measuring a speed of the first network path, wherein adjusting the selected network path from the first network path to the second network path is based at least in part on the speed of the first network path being below a threshold.

8. The method of claim 7, further comprising:
measuring a speed of the second network path,
wherein adjusting the selected network path from the first network path to the second network path is based on the speed of the second network path exceeding the speed of the first network path.

9. The method of claim 7, wherein measuring the speed of the first network path includes measuring a round-trip transmission time between the client device and the server via the first network path.

10. The method of claim 1, further comprising establishing an encrypted channel between the client device and the server, the encrypted channel implemented with a virtual private network (VPN) that conveys the data for the single application but for no other application running on the client device.

11. A client device, comprising control circuitry that includes a set of processors coupled to memory, the control circuitry configured to:
contact a server via a website and download an application package from the server;
open the downloaded application package, decompress compressed contents of the application package, and install components of the application package,
wherein the components of the application package include (i) a client component of an application, (ii) a micro-VPN client component and (iii) a link-bonding client component, the micro-VPN client component configured to establish an encrypted channel between the client component of the application and a single application on the server, the link-bonding client component configured to transmit data from the client component of the application in parallel over a plurality of network paths;
monitor the plurality of network paths that convey data between the client device and the server, the data being associated with the single application on the server;
receive, within the encrypted channel established by the micro-VPN client component, the data from the server via each of the plurality of network paths, the data received from each of the plurality of network paths being the same;
select, by the link-bonding client component, a first network path of the plurality of network paths from which to receive data to enable delivery of the single application on the server to the client device; and
adjust, by the link-bonding client component, the selected network path from the first network path to a second network path of the plurality of network paths, while both the first network path and the second network path are operational and conveying data based at least in part on the monitoring of the plurality of network paths, so as to prevent delay in receipt of data from the server caused by a reduction of network continuity of the first network path.

12. The client device of claim 11, wherein the control circuitry is further configured to transmit a set of application data to the server via both the first network path and the second network path, the first network path and the second network path conveying the same set of application data in parallel.

13. The client device of claim 11, wherein the control circuitry is further configured to discard data of the single application arriving via the first network path after adjusting the selected network path from the first network path to the second network path.

14. The client device of claim 13, wherein the data of the single application arrives in packets, each packet having a sequence identifier, and wherein the control circuitry is further configured to discard data of the single application arriving via the first network path by identifying a packet arriving via the first network path as redundant based on the sequence identifier of the packet matching the sequence identifier of a packet that arrived via the second network path.

15. The client device of claim 11, wherein the first network path is a Wi-Fi network path and the second network path is a cellular network path.

16. The client device of claim 15, wherein the cellular network path is an LTE (Long-Term Evolution) network path.

17. The client device of claim 11, wherein the control circuitry is further configured to measure a speed of the first network path and to adjust the selected network path from the first network path to the second network path based at least in part on the speed of the first network path being below a threshold.

18. The client device of claim 17, wherein the control circuitry is further configured to measure a speed of the second network path and to adjust the selected network path from the first network path to the second network path based on the speed of the second network path exceeding the speed of the first network path.

19. The client device of claim 17, wherein the control circuitry configured to measure the speed of the first network path is further configured to measure a round-trip transmission time between the client device and the server via the first network path.

20. The client device of claim 11, wherein the control circuitry is further configured to establish an encrypted channel between the client device and the server, the encrypted channel implemented with a virtual private network (VPN) configured to convey the data for the single application but for no other application running on the client device.

21. A computer program product including a set of non-transitory, computer-readable media having instructions which, when executed by control circuitry of a client device, cause the client device to perform a method comprising:
contacting a server via a website and downloading an application package from the server, the client device opening the downloaded application package, decompressing compressed contents of the application package, and installing components of the application package, the components of the application package including (i) a client component of an application, (ii) a micro-VPN client component and (iii) a link-bonding client component, the micro-VPN client component configured to establish an encrypted channel between the client component of the application and a single application on the server, the link-bonding client component configured to transmit data from the client component of the application in parallel over a plurality of network paths;

monitoring the plurality of network paths that convey data between the client device and the server, the data being associated with the single application on the server;

receiving, within the encrypted channel established by the micro-VPN client component, the data from the server via each of the plurality of network paths, the data received from each of the plurality of network paths being the same;

selecting, by the link-bonding client component, a first network path of the plurality of network paths from which to receive data to enable delivery of the single application on the server to the client device; and adjusting, by the link-bonding client component, the selected network path from the first network path to a second network path of the plurality of network paths, while both the first network path and the second network path are operational and conveying data, based at least in part on the monitoring of the plurality of network paths, so as to prevent delay in receipt of data from the server caused by a reduction of network continuity of the first network path.

22. The computer program product of claim 21, wherein the method further comprises transmitting application data to the server via both the first network path and the second network path, the first network path and the second network path conveying the same application data in parallel.

23. The computer program product of claim 21, wherein the method further comprises, after adjusting the selected network path from the first network path to the second network path, discarding data of the single application arriving via the first network path.

24. The computer program product of claim 23, wherein the data of the single application arrives in packets, each packet having a sequence identifier, and wherein discarding data of the single application arriving via the first network path includes identifying a packet arriving via the first network path as redundant based on the sequence identifier of the packet matching the sequence identifier of a packet that arrived via the second network path.

25. The computer program product of claim 21, wherein the first network path is a Wi-Fi network path and the second network path is a cellular network path.

26. The computer program product of claim 25, wherein the cellular network path is an LTE (Long-Term Evolution) network path.

27. The computer program product of claim 21, wherein the method further comprises measuring a speed of the first network path, and wherein adjusting the selected network path from the first network path to the second network path is based at least in part on the speed of the first network path being below a threshold.

28. The computer program product of claim 27, wherein the method further comprises measuring a speed of the second network path, and wherein adjusting the selected network path from the first network path to the second network path is further based on the speed of the second network path exceeding the speed of the first network path.

29. The computer program product of claim 27, wherein measuring the speed of the first network path includes measuring a round-trip transmission time between the client device and the server via the first network path.

30. The computer program product of claim 21, wherein the method further comprises establishing an encrypted channel between the client device and the server, the encrypted channel, the encrypted channel implemented with a virtual private network (VPN) that conveys the data for the single application but for no other application running on the client device.

* * * * *